US011573413B2

(12) United States Patent
Sun et al.

(10) Patent No.: US 11,573,413 B2
(45) Date of Patent: Feb. 7, 2023

(54) EQUATORIAL MOUNT FOR TELESCOPE WITH BALANCED WEIGHT DISTRIBUTION

(71) Applicant: Nantong Schmidt Opto-Electrical Technology Co., Ltd., Nantong (CN)

(72) Inventors: Yufeng Sun, Nantong (CN); Wenzhong Shen, Nantong (CN); Xuefeng Zhu, Nantong (CN)

(73) Assignee: Nantong Schmidt Opto-Electrical Technology Co., Ltd., Jiangsu (CN)

(*) Notice: Subject to any disclaimer, the term of this patent is extended or adjusted under 35 U.S.C. 154(b) by 90 days.

(21) Appl. No.: 16/779,423

(22) Filed: Jan. 31, 2020

(65) Prior Publication Data

US 2020/0192076 A1 Jun. 18, 2020

Related U.S. Application Data

(63) Continuation-in-part of application No. PCT/CN2017/110668, filed on Nov. 13, 2017.

(51) Int. Cl.
*G02B 23/00* (2006.01)
*G02B 23/16* (2006.01)

(52) U.S. Cl.
CPC .................. *G02B 23/165* (2013.01)

(58) Field of Classification Search
CPC ....... G02B 23/165; G02B 23/00; G02B 23/16
USPC ................. 359/430, 362, 399, 429
See application file for complete search history.

(56) References Cited

U.S. PATENT DOCUMENTS

| 4,202,110 A | 5/1980 | Kooi |
| 4,929,118 A | 5/1990 | Anderson |
| 2004/0136061 A1 | 7/2004 | Denpo et al. |

FOREIGN PATENT DOCUMENTS

| CN | 102207381 A | | 10/2011 | |
| CN | 102866496 A | * | 1/2013 | ............ G02B 23/16 |
| CN | 102866496 A | | 1/2013 | |
| CN | 202748534 U | | 2/2013 | |
| CN | 203535305 U | | 4/2014 | |
| CN | 104019333 A | | 9/2014 | |
| CN | 203894470 U | * | 10/2014 | |
| CN | 203894470 U | | 10/2014 | |
| CN | 105674949 A | | 6/2016 | |
| CN | 107202568 A | | 9/2017 | |
| CN | 107270865 A | | 10/2017 | |
| CN | 105508446 B | | 6/2018 | |
| CN | 105627983 B | | 6/2018 | |
| DE | 10326412 A1 | * | 12/2004 | ........... G02B 23/165 |
| DE | 102009004637 A1 | * | 7/2010 | ............ G02B 23/16 |

* cited by examiner

*Primary Examiner* — Arnel C Lavarias
(74) *Attorney, Agent, or Firm* — Chernoff, Vilhauer, McClung & Stenzel, LLP

(57) ABSTRACT

An equatorial mount for providing a telescope with a balanced weight distribution is described. The equatorial mount includes a base, a declination base, and a device support. The declination base is rotatable about a right ascension axis relative to the base. The device support is rotatable about a declination axis relative to the declination base. The declination axis intersects orthogonally with the right ascension axis and the declination axis intersects a midsection of the declination base. The declination base includes a counterweight assembly extending along a counterweight axis, the counterweight axis being spaced away from the declination axis along the right ascension axis.

15 Claims, 7 Drawing Sheets

EQUATORIAL MOUNT FOR TELESCOPE WITH BALANCED WEIGHT DISTRIBUTION

REFERENCE TO RELATED APPLICATIONS

This application is a continuation-in-part of Patent Cooperation Treaty (PCT) application No. PCT/CN2017/110668 having an international filing date of 13 Nov. 2017. PCT application No. PCT/CN2017/110668 in turn claims priority from Chinese application No. 201710637187.X filed 31 Jul. 2017. All of the applications referenced in this paragraph are hereby incorporated herein by reference for all purposes.

TECHNICAL FIELD

The present invention relates to an equatorial mount for an optical assembly. Some embodiments of the present invention relate to an equatorial mount for providing a telescope with a balanced weight distribution.

BACKGROUND

Equatorial mounts have long been used for astronomical telescopes and cameras. Equatorial mounts compensate for Earth's rotation and provide single-axis tracking of celestial objects.

The German equatorial mount, also referred to "GEM" for short, is known in the art. A German equatorial mount typically has a right ascension shaft, a declination shaft, and a counterweight shaft. The right ascension shaft is rotatable relative to the base about a right ascension axis. The declination shaft is rotatable relative to the right ascension shaft about a declination axis. The declination axis is orthogonal to the right ascension axis. The counterweight shaft is mounted to one end of the right ascension shaft and extends from the right ascension shaft along a counterweight axis that is co-linear with the declination axis.

Typically, telescopes mounted on a German equatorial mount suffer from an unbalanced weight distribution. The unbalanced weight distribution may decrease the structural stability of the mounted telescope and may cause the operation of the telescope to be relatively inconvenient.

There is a general desire for an equatorial mount for providing a telescope with a relatively more balanced weight distribution.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides an equatorial mount for an optical assembly. The equatorial mount comprises a base; a declination base coupled to the base and rotatable relative to the base about a right ascension axis, the declination base comprising a body and a counterweight assembly extending from the body along a counterweight axis; and a device support supported by the declination base for rotation with the declination base about the right ascension axis, the device support rotatable relative to the declination base about a declination axis. The right ascension axis is orthogonal to the declination axis. The declination axis intersects a midsection of the declination base. The counterweight axis is parallel to, and spaced apart from, the declination axis.

In some embodiments, the counterweight axis is spaced apart, in a direction parallel to the right ascension axis, from the declination axis.

In some embodiments, the body comprises first and second opposed ends and the midsection is located between, and spaced apart in a direction parallel to the right ascension axis from, each of the first and second opposed ends.

The right ascension axis may be spaced away from the midsection in a direction parallel to the declination axis. Alternatively, the right ascension axis may intersect the midsection.

In some embodiments, the body has a declination base length measured in the direction parallel to the right ascension axis between the first and second ends, and the midsection has a midsection length measured in the direction parallel to the right ascension axis, the midsection length between 10%-80% of the declination base length. In other words, the midsection is spaced apart from each of the first and second ends by at least 10% of the declination base length.

In some embodiments, the counterweight assembly extends from the first end of the body along the counterweight axis.

In some embodiments, the counterweight assembly extends along the counterweight axis from a location on the body that is more proximate to the first end of the body than the declination axis.

The base may comprise a right ascension support extending axially along the right ascension axis. The right ascension support may comprise a sleeve, the sleeve comprising a bore-defining surface that defines a right ascension bore that extends axially along the right ascension axis.

The body of the declination base may comprise first and second opposed ends; and a first declination support at the first end, the first declination support being rotatably coupled to the right ascension support to thereby facilitate rotation of the declination base relative to the base about the right ascension axis. The first declination support may comprise a first declination-support sleeve shaped to define a first declination-support bore extending axially along the right ascension axis. The right ascension support may comprise a right ascension shaft portion which extends into the first declination-support bore, the right ascension shaft portion comprising a bearing surface that bears against a bore-defining surface of the first declination-support sleeve to provide the rotational coupling between the first declination support and the right ascension support.

The body of the declination base may comprise a second declination support at the second end to thereby facilitate rotation of the declination base relative to the base about the right ascension axis, the second declination support spaced apart from the first declination support in a direction parallel with the right ascension axis.

The base may comprise a second right ascension support extending axially along the right ascension axis and the second declination support comprises a second declination-support sleeve shaped to define a second declination-support bore extending axially along the right ascension axis. The second right ascension support comprises a second right ascension shaft portion which extends into the second declination-support bore, the second right ascension shaft portion comprising a bearing surface that bears against a bore-defining surface of the second declination-support sleeve to provide the rotational coupling between the second declination support and the second right ascension support.

The right ascension support may bear against both the first and second declination supports.

The equatorial mount may comprise a gear assembly operatively couplable between the declination base and the base, such that, when coupled, actuation of the gear assembly causes corresponding rotation of the declination base about the right ascension axis relative to the base.

Another aspect of the invention provides an equatorial mount mechanism with stable load-bearing.

The equatorial mount mechanism with stable load-bearing, the equatorial mount may comprise a declination base, a right ascension shaft, an hour angle base bearing, a counterweight, an hour angle base, an hour angle locking handle, a positioning key, a positioning recess, a counterweight lever, and a polar scope. The declination base may have a body that is a cuboid. Two connecting frames (elsewhere may be referred to as declination supports) are designed at two ends below the body of the declination base. The hour angle base (elsewhere may be referred to as a base) has an upper portion and a lower portion coupled to each other by screws. The upper portion and the lower portion may further be coupled by a positioning recess and a positioning key. The positioning key is an elongated protrusion located on the lower portion. A corresponding positioning recess is located on the upper end. When the positioning key is inserted into the corresponding positioning recess, the upper portion (comprising a right ascension support) is fixedly coupled to the lower portion. A right ascension shaft may pass through the two connecting frames and the hour angle base. A polar scope may be coupled to the right ascension shaft at one end along the right ascension axis. Bearings can be used to assist with the rotation of declination base relative to the base. The right ascension shaft may function as an alignment and hinge pin to rotatably connect the declination base to the base. An hour angle locking handle may be located on one end of the right ascension shaft. The lower portion of the base may be a semi-circular body; the right ascension shaft is connected in a fixed manner to one end of the hour angle base, then a support bearing is installed on one end of the hour angle base and a support bearing is also installed on a fixed hour angle shaft; then two ends of the hour angle base are connected to the two ends below the declination base. The declination base and the hour angle base are both connected together by means of the right ascension shaft; the hour angle locking handle and a declination locking handle are designed at two ends at the same side of the declination base respectively; the counterweight lever is designed below and to the right of the declination base; the counterweight lever is connected in a fixed manner to the declination base; the counterweight is designed to be installed at a lower end of the counterweight lever; and the counterweight is circularly annular and connected in a fixed manner to the counterweight lever.

The right ascension shaft runs through an hour angle worm wheel; the hour angle worm wheel is connected in a fitted manner to the right ascension shaft; an hour angle worm is designed above the hour angle worm wheel; and the hour angle worm wheel is connected in a meshed manner to the hour angle worm.

A support seat is disposed in the connecting frame below and to the right of the hour angle base; a fixing hole is designed on the hour angle base; a fixing bolt is designed on the support seat; the support seat is connected in a fixed manner to the fixing hole on the hour angle base by means of the fixing bolt; a latitude pedestal is designed below the support seat; a transverse latitude adjustment worm is designed above the latitude pedestal; a screw-thread is designed on the latitude adjustment worm; a fitted connection exists between the latitude adjustment worm and the latitude pedestal; a latitude adjustment bevel gear is designed on the hour angle base; the latitude adjustment bevel gear is connected in a fitted manner to the hour angle base by means of a rotary rod on the hour angle base; a gear groove is designed at an edge of a latitude adjustment worm wheel; and a meshed connection exists between the gear groove and the screw-thread on the latitude adjustment worm.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

Figure 1:
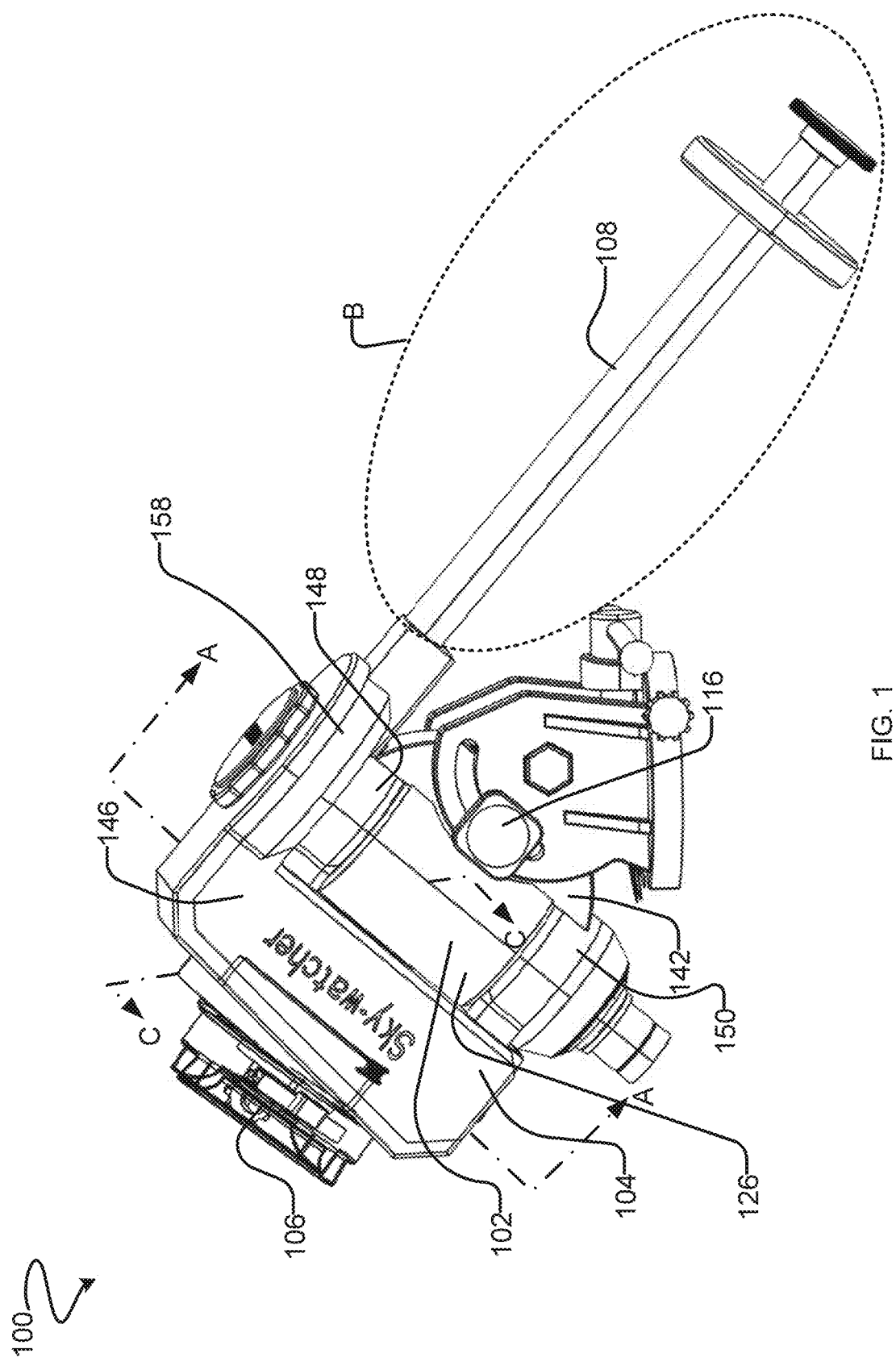
FIG. 1 is a perspective view of an equatorial mount according to a first embodiment of the present invention.

The present invention relates to an equatorial mount for a telescope or other optical instrument. Aspects of the invention relate to an equatorial mount for providing a telescope and/or the mount with a relatively more balanced weight distribution when compared to prior art equatorial mounts. The equatorial mount comprises a base, a declination base, and a device support. The declination base is coupled to the base and is rotatable relative to the base about a right ascension axis. The declination base comprises a body and a counterweight assembly extending from the body along a counterweight axis. The device support is supported by the declination base for rotation with the declination base about the right ascension axis. The right ascension axis is orthogonal to the declination axis. The declination axis intersects a midsection of the declination base. The counterweight axis is parallel to, and spaced apart from, the declination axis. The counterweight axis may be spaced apart from the declination axis in a direction parallel with the right ascension axis. This arrangement lowers the center of gravity relative to prior art equatorial mounts and leads to balanced weight distribution for a telescope or other optical instrument mounted on the mount and/or for the mount itself.

Two embodiments will be described in detail below to provide a more thorough understanding to persons skilled in the art. However, a person skilled in the art would understand that additional and/or alternative embodiments consistent with this disclosure are also possible.

In both embodiments, the base comprises a right ascension support extending axially along the right ascension axis. The declination base comprises a first declination support that is rotatably coupled to the right ascension support to thereby facilitate rotation of the declination base relative to the base about the right ascension axis.

The two embodiments differ from each other. In the first embodiment, the right ascension support comprises a sleeve, the sleeve comprising a bore-defining surface that defines a right ascension bore that extends axially along the right ascension axis. A first declination support of the first embodiment comprises a declination shaft portion which extends into the right ascension bore, the declination shaft portion comprising a bearing surface that bears against a bore-defining surface of the right ascension sleeve to provide the rotational coupling between the first declination support and the right ascension support.

In the second embodiment, the first declination support comprises a first declination-support sleeve shaped to define a first declination-support bore extending axially along the right ascension axis. The right ascension support comprises a right ascension shaft portion which extends into the first declination-support bore, the right ascension shaft portion comprising a bearing surface that bears against a bore-defining surface of the first declination-support sleeve to provide the rotational coupling between the first declination support and the right ascension support.

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

First Embodiment

Figure 2:
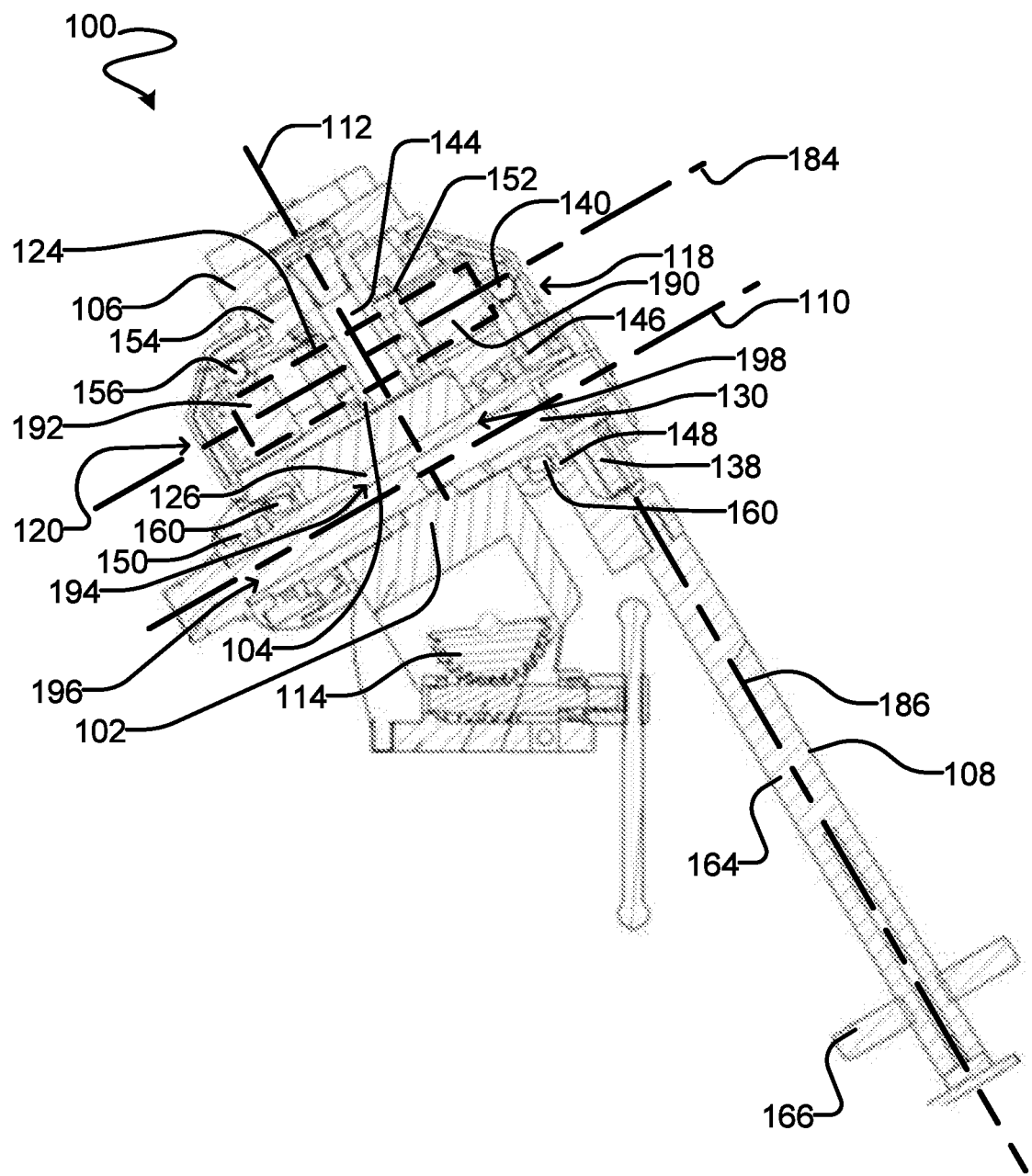
FIG. 2 is a cross-sectional view of the equatorial mount of FIG. 1 taken through the centre of the equatorial mount along the line A-A.
Figure 3:
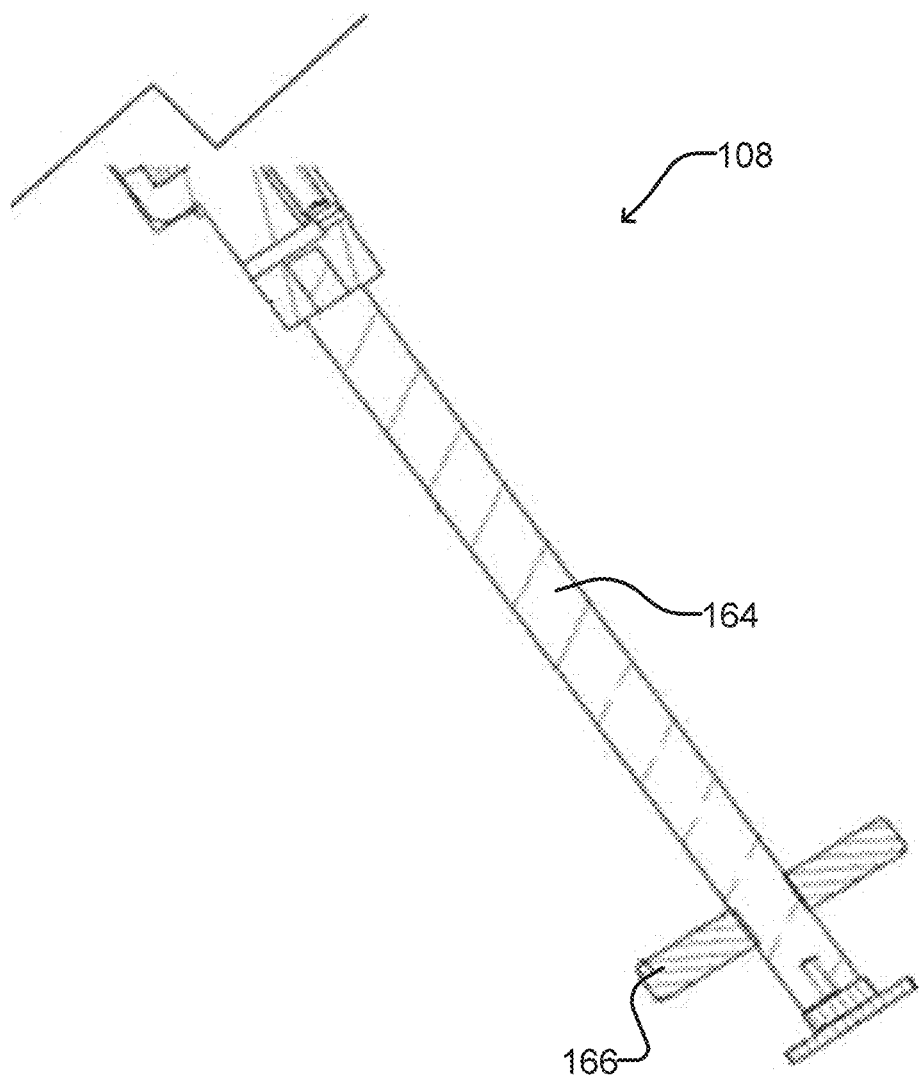
FIG. 3 is an enlarged partial view of section B of the FIG. 1 equatorial mount.
Figure 4:
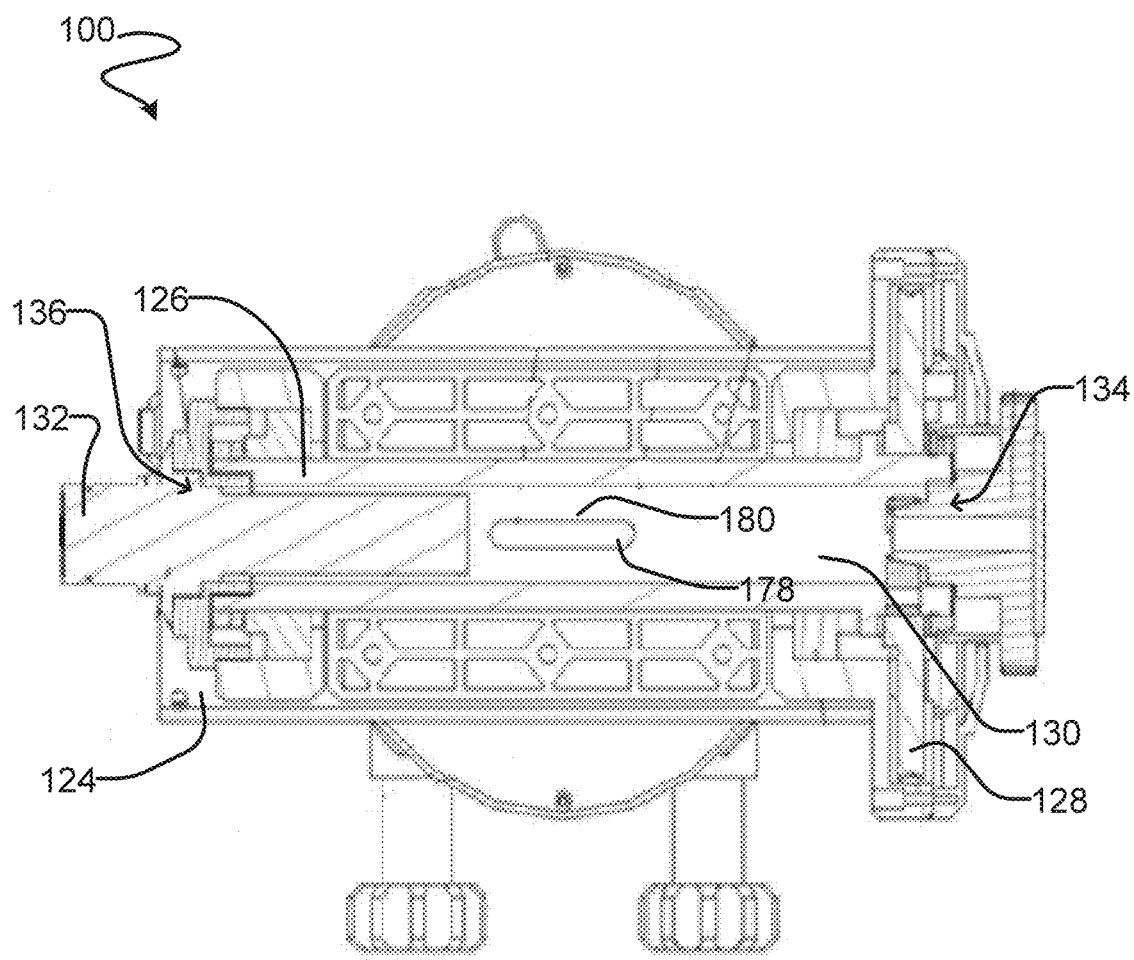
FIG. 4 is a cross-sectional view of the equatorial mount of FIG. 1 taken along the line C-C.

FIGS. 1 to 4 show an example embodiment of an equatorial mount 100. FIG. 1 is a perspective view of equatorial mount 100 showing the lines along which the two selected cross-sections are taken. FIG. 2 is a cross-sectional view of equatorial mount 100 taken through the centre of equatorial mount 100 along the line A-A, schematically illustrating elements of equatorial mount 100. FIG. 3 is a partially enlarged view of a counterweight assembly 108. FIG. 4 is a cross-section view of equatorial mount 100 taken along the line C-C.

Equatorial mount 100 comprises a base 102, a declination base 104, and a device support 106. These components are linked in the following arrangement:

Base 102 is stationary relative to a right ascension axis 110. Base 102 typically includes components (not expressly enumerated) for coupling mount 100 to a tripod.

Declination base 104 is rotatably coupled to base 102. Declination base 104 is rotatable about right ascension axis 110 relative to base 102.

Device support 106 is coupled to declination base 104. Device support 106 is rotatable about a declination axis 112 relative to declination base 104. Device support 106 is also rotatable about right ascension axis 110 in a sense because device support 106 moves with declination base 104 when declination base 104 rotates about right ascension axis 110 relative to base 102.

Base 102 does not rotate about right ascension axis 110. Base 102 comprises a right ascension support 126. In the illustrated embodiment of FIGS. 1-4, right ascension support 126 comprises a sleeve that is in the shape of a hollow (generally annular) tube that has a bore-defining surface 194 that defines a right ascension bore 196 that extends axially along right ascension axis 110—i.e. right ascension axis 110 extends along an axial center of bore 196 defined by bore-defining surface 194 of right ascension support 126.

Figure 5:
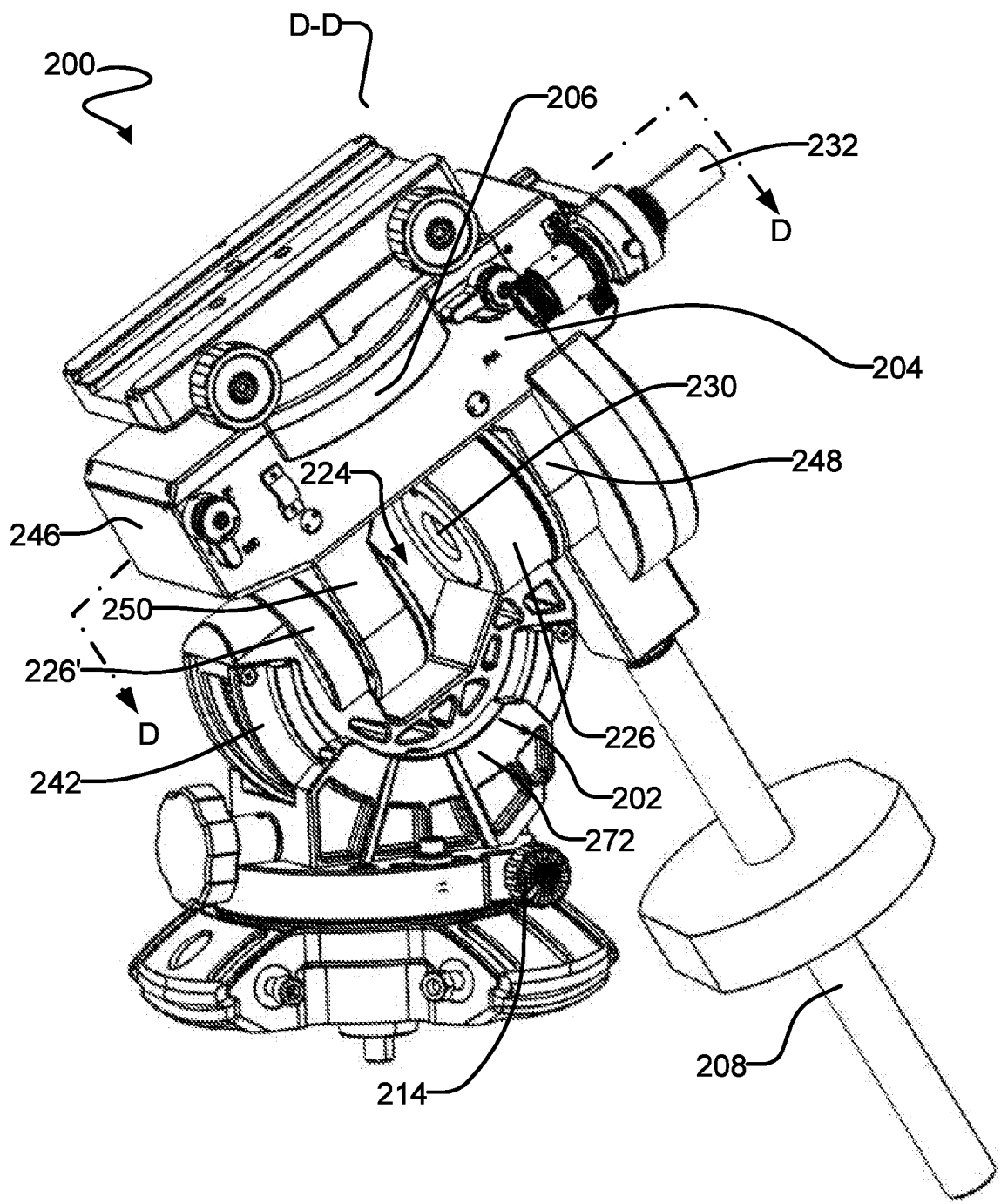
FIG. 5 is a perspective view of an equatorial mount according to a second embodiment of the present invention.
Figure 6:
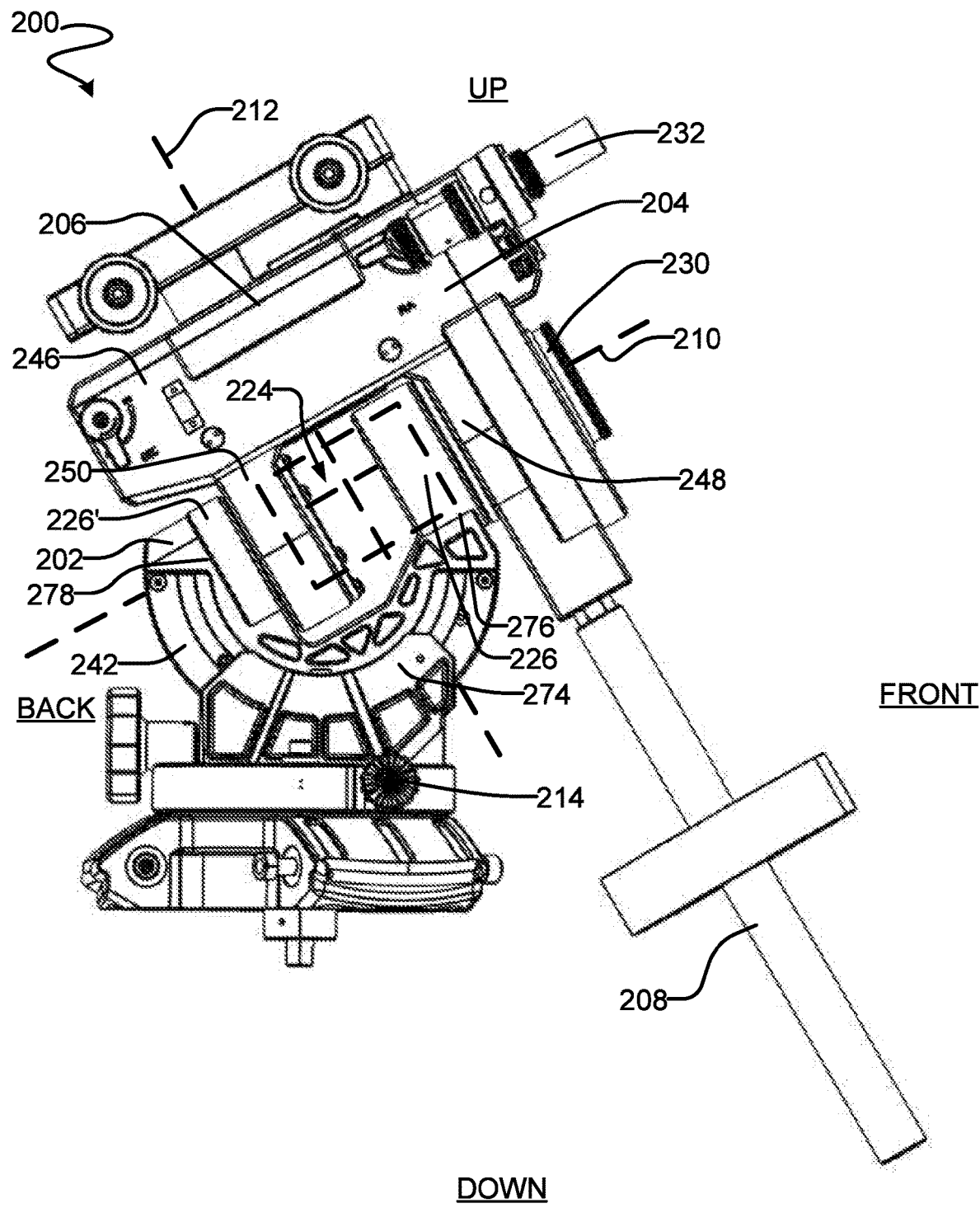
FIG. 6 is a side elevation view of the equatorial mount of FIG. 5.
Figure 7:
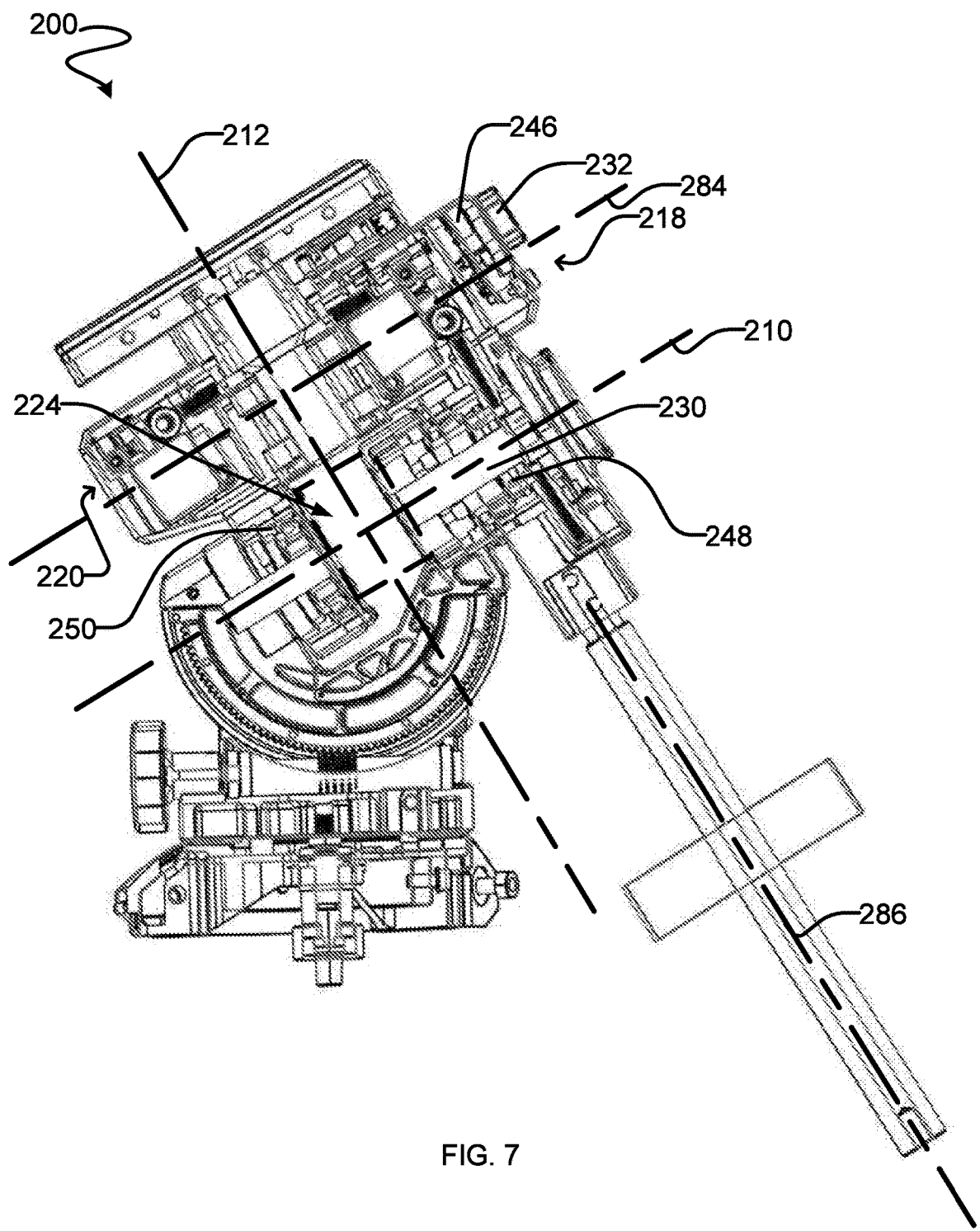
FIG. 7 is a cross-sectional view of the equatorial mount of FIG. 5 taken through the centre of the equatorial mount along the line D-D.

Right ascension support 126 comprises first and second opposed open ends 134, 136 and right ascension support 126 extends from first open end 134 to second open end 136 along right ascension axis 110. Right ascension support 126 can be of any suitable configuration and/or shape as long as right ascension support 126 functions to support declination base 104 along right ascension axis 110 and permit rotation of declination base 104 relative to right ascension axis 110. For example, in some embodiments, right ascension support 126 may be a solid tube axially aligned along right ascension axis 110. Another embodiment of right ascension support 126 is shown in FIGS. 5 to 7.

Base 102 comprises a lower portion 142 extends downwardly from right ascension support 126. Lower portion 142 and right ascension support 126 may be integrally formed as one piece. Alternatively, lower portion 142 and right ascension support 126 may be individually formed and may then be coupled together in any suitable manner known in the art. For example, right ascension support 126 and lower portion 142 may connected by screws. To reinforce the connection between right ascension support 126 and lower portion 142, a locking mechanism may be used. The locking mechanism of the illustrated embodiment of FIGS. 1-4 comprises a positioning protrusion 178 on lower portion 142 and a corresponding positioning recess 180 on right ascension support 126. When positioning protrusion 178 is inserted into positioning recess 180, the fixed connection between right ascension support 126 and lower portion 142 is reinforced.

Through lower portion 142, right ascension support 126 may sit on and be coupled to a latitude adjustment assembly 114. Latitude adjustment assembly 114 is for aligning mount 100 so that the angle of altitude adjustment assembly 114 is set to be approximately the same as the latitude where mount 100 is used. In the illustrated embodiment and as better shown in FIG. 1, lower portion 142 has a through-hole. A bolt is extended through the through hole to form an attachment 116 and to thereby connect lower portion 142 to latitude adjustment assembly 114. Right ascension support 126 may be rotatable about the centreline of attachment 116 to allow polar alignment. A person skilled the in art would understand that lower portion 142 can be coupled to latitude adjustment assembly 114 by any suitable means.

Declination base 104 comprises a body 146 and a counterweight assembly 108 extending from body 146 along a counterweight axis 186 (FIG. 2). Counterweight axis 186 is parallel to, and spaced apart from, declination axis 112. Counterweight axis 186 may be spaced apart from declination axis 112 in a direction that is parallel with right ascension axis 110.

Body 146 comprises first and second opposed ends 118, 120 spaced apart along a direction 184 that is parallel to right ascension axis 110. A midsection 124 is located between, and spaced apart in a direction parallel to right ascension axis 110 from, the first and second opposed ends 118, 120. Body 146 has a declination base length measured in direction 184 between first and second ends 118, 120. Midsection 124 has a midsection length measured in direction 184 and the midsection length may be between 10%-80% of the declination base length, including any value therebetween, e.g. 15%, 20%, 25%, 30%, 35%, 40%, 45%, 50%, 55%, 60%, 65%, 70%, and 75%. In other words, body 102 has a declination base length measured in direction 184 between first and second ends 118, 120. Midsection 124 may be spaced apart from each of first and second ends 118, 120 by at least 10% of the declination base length.

Body 146 of the illustrated embodiment of FIGS. 1-4 comprises a pair of declination supports 148, 150 extending from first and second opposed ends 118, 120, respectively. First and second supports 148, 150 are rotatably coupled to right ascension support 126 to thereby facilitate rotation of declination base 104 relative to base 102 about right ascension axis 110. First and second declination supports 148, 150 may be axially aligned along right ascension axis 110.

First declination support 148 comprises a declination shaft portion 130 that extends into right ascension bore 196 of right ascension support 126. Declination shaft portion 130 comprises a bearing surface 198 that bears against the bore-defining surface 194 of right ascension support 126 to provide the rotational coupling between declination support 148 and right ascension support 126.

Second declination support 150 comprises a second declination-support sleeve shaped to define a second declination-support bore extending axially along the right ascension axis 110—i.e. a centerline of the second declination-support bore may extend along the right ascension axis 110.

In other embodiments, first and second declination supports 148, 150 can be of any suitable configurations and shapes as long as first and second declination supports 148, 150 can be coupled to base 102 (e.g. to right ascension support 126) to enable rotation of declination base 104 relative to base 102 about right ascension axis 110.

Counterweight assembly 108 may be configured to achieve balance about right ascension axis 110 and/or to otherwise help to balance mount 100. Counterweight assembly 108 comprises a counterweight shaft 164 and a counterweight mass 166. Counterweight shaft 164 is attached to and extends from first declination support 148 along counterweight axis 186. Counterweight axis 186 is spaced away from declination axis 112. Counterweight axis 186 may be space apart from declination axis 112 in a direction parallel with right ascension axis 110.

Declination base 104 is coupled to base 102 and is rotatable relative to base 102 about right ascension axis 110. In the illustrated embodiment, declination supports 148, 150 and right ascension support 126 provide the rotatable connection between declination base 104 and base 102.

To connect right ascension support 126 with first declination support 148, declination shaft portion 130 of first declination support 148 is inserted into right ascension support 126 so that the bearing surface of declination shaft portion 130 bears against the bore-defining surface of right ascension support 126.

To connect right ascension support 126 with second declination support 150, a polar scope 132 in inserted into the bore of right ascension support 126 and the bore of second declination support 150. Polar scope 132 functions as an alignment and hinge pin along right ascension axis 110.

Other structural arrangements are possible to rotatably couple declination base 104 with base 102, so that declination base 104 is rotatable relative to base 102 about right ascension axis 110. For example, in some embodiments, body 146 comprises only one declination support in the shape of a generally hollowed-out (e.g. annular or tubular) cylinder (instead of two declination supports as shown in the illustrated embodiment). Such a declination support may extend from first end 118 to second end 120 of body 146 of declination base 104. Such a declination support may axially and concentrically surround right ascension support 126 and be rotatable relative to right ascension support 126 about right ascension axis 110. In another embodiment, declination supports 148, 150 and right ascension support 126 may each provide a bore extending axially along right ascension axis 110. Right ascension support 126 may be located (in a direction parallel with right ascension axis 110) between declination supports 148, 150. An alignment and hinge pin may be inserted within the axially aligned bores of such declination supports 148, 150 and right ascension support 126.

Bearings 160 between declination base 104 and base 102 may be present to further assist in permitting relative rotation of declination base 104 relative to base 102 about right ascension axis 110.

To actuate rotation of declination base 104 relative to base 102 about right ascension axis 110, right ascension gear assembly 128 may be used. Gear assembly 128 may be coupled to declination base 104. Actuation of gear assembly 128 may cause corresponding rotation of declination base 104 about right ascension axis 110 relative to base 102. In the particular case of the illustrated embodiment of FIGS. 1-4, gear assembly 128 comprises a worm gear 140 and a worm wheel 138, such that actuation of worm gear 140 causes corresponding rotation of declination base 104 about right ascension axis 110 relative to base 102.

Gear assembly 128 may be driven by a motor 190 allowing motorized rotation of declination base 104 about right ascension axis 110. A person skilled in the art would understand that motor 190 may be coupled to declination base 104 to drive declination base 104 about right ascension axis 110 without the use of gearing. Motor 190 is housed within body 146.

In some embodiments, gear assembly 128 comprises a worm wheel 138 and a worm gear 140. Worm wheel 138 may be coupled to right ascension shaft 130 and worm gear 140 may be coupled to declination base 104. Rotation of worm gear 140 may cause worm wheel 138 and thus declination base 104 to rotate about right ascension axis 110.

Device support 106 comprises a declination shaft 144. Declination shaft 144 extends axially along declination axis 112 relative to declination base 104 i.e. an axial centerline of declination shaft 144 may be co-linear with declination axis 112. Declination shaft 144 is rotatable about declination axis 112 relative to declination base 104 and is rotatable with declination base 104 about right ascension axis 110.

To enable rotation of declination shaft 144 relative to declination base 104 about declination axis 112, declination gear assembly 152 may be used. Declination gear assembly 152 may be coupled to declination base 104. Actuation of declination gear assembly 152 may cause corresponding rotation of declination shaft 144 about declination axis 112 relative to declination base 104. Declination gear assembly 152 may comprise a worm gear 156 and a worm wheel 154, such that actuation of worm gear 156 causes corresponding rotation of declination shaft 144 about declination axis 112 relative to declination base 104.

In the illustrated embodiment of FIGS. 1-4, declination gear assembly 152 is driven by a motor 192, allowing motorized rotation of declination shaft 144 about declination axis 112. A person skilled in the art would understand that motor 192 may be coupled to declination shaft 144 to drive declination shaft 144 about declination axis 112 without the use of gearing. Motor 192 may be housed within body 146.

When a telescope or other optical device (not shown) is mounted on equatorial mount 100, rotation of declination shaft 144 about declination axis 112 rotates the optical device about declination axis 112. Rotation of declination base 104 about right ascension axis 110 causes the optical device to rotate about right ascension axis 110. Declination axis 112 intersects orthogonally with right ascension axis 110 and declination axis 112 intersects midsection 124 of declination base 104. Counterweight axis 186 is spaced away from declination axis 112. Counterweight axis 186 may be spaced apart from declination axis 122 in a direction parallel to right ascension axis 110. An advantage of this arrangement is to lower the center of gravity of an optical device mounted on equatorial mount 100 and/or the center of gravity of mount 100 itself.

As shown in FIG. 2, right ascension axis 110 may be spaced away from midsection 124 in a direction parallel to declination axis 112. In some embodiments, right ascension axis 110 intersects midsection 124.

The body of the declination base may be a cuboid; two connecting frames (elsewhere referred to as declination supports) are designed at two ends below the body of the declination base; the hour angle base is divided into an upper portion and a lower portion; the upper and lower portions of the hour angle base are connected by a screw; the positioning key is designed at a position in the middle of the upper and lower portions of the hour angle base; the positioning key takes the form of a long, protruding strip; two positioning recesses are designed at a middle position of the right ascension shaft, opposite a position of the positioning key; the positioning recess takes the form of a long, recessed strip; the positioning key and the positioning recess fit each other; the positioning key is inserted into the positioning recess; the right ascension shaft is connected in a fixed manner to the hour angle base; the right ascension shaft runs through the connecting frames at the two ends below the declination base and through the hour angle base; a polar scope is designed at a left end of the right ascension shaft; one end of a polar scope shaft is inserted into the right ascension shaft, another end being connected to the connecting frame at a left end of the declination base; the hour angle base bearing is disposed at positions of convergence of two ends of the right ascension shaft and the connecting frames of the declination base; the declination base and the hour angle base are both connected together by means of the right ascension shaft; the hour angle locking handle is designed at an outer side of the hour angle base bearing at a right end of the right ascension shaft; the hour angle locking handle is connected in a fixed manner to the right ascension shaft; the counterweight lever is designed below and to the right of the declination base; the counterweight lever is connected in a fixed manner to the declination base; the counterweight is designed to be installed at a lower end of the counterweight lever; and the counterweight is circularly annular and connected in a fixed manner to the counterweight lever.

The right ascension shaft runs through an hour angle worm wheel; the hour angle worm wheel is connected in a fitted manner to the right ascension shaft; an hour angle worm is designed above the hour angle worm wheel; and the hour angle worm wheel is connected in a meshed manner to the hour angle worm.

A support seat is disposed in the connecting frame below and to the right of the hour angle base; a fixing hole is designed on the hour angle base; a fixing bolt is designed on the support seat; the support seat is connected in a fixed manner to the fixing hole on the hour angle base by means of the fixing bolt; a latitude pedestal is designed below the support seat; a transverse latitude adjustment worm is designed above the latitude pedestal; a screw-thread is designed on the latitude adjustment worm; a fitted connection exists between the latitude adjustment worm and the latitude pedestal; a latitude adjustment worm wheel is designed on the hour angle base; the latitude adjustment worm wheel is connected in a fitted manner to the hour angle base by means of a rotary rod on the hour angle base; a gear groove is designed at an edge of the latitude adjustment worm wheel; and a meshed connection exists between the gear groove and the screw-thread on the latitude adjustment worm.

During use of the present utility model, by designing such a load-bearing mechanism, when the declination base rotates relative to the right ascension shaft, due to the fact that the counterweight is connected in a fixed manner to the declination base, the counterweight also rotates as the declination base rotates, the center of gravity of the equatorial mount is lowered, and load-bearing is heavier, increasing the stability of the equatorial mount.

Second Embodiment

FIGS. 5 to 7 show a second example embodiment of an equatorial mount 200. Equatorial mount 200 is generally similar to equatorial mount 100 as shown in FIGS. 1-4 and like elements have been illustrated with reference numerals incremented by 100 and are not further described again.

Equatorial mount 200 comprises a base 202; a declination base 204, and a device support 206. Declination base 204 is rotatably coupled to base 202. Declination base 204 is rotatable about right ascension axis 210 relative to base 202. Device support 206 is coupled to declination base 204. Device support 206 is rotatable about a declination axis 212 relative to declination base 204. Device support is also rotatable about right ascension axis 210 in a sense because device support 206 moves with declination base 204 when declination base 204 rotates about right ascension axis 210 relative to base 202.

Declination base 204 comprises a body 246 and a counterweight assembly 208 extending from body 246 along a counterweight axis 286. Counterweight axis 286 is parallel to, and spaced apart from, declination axis 212.

Body 246 comprises first and second opposed ends 218, 2220 spaced apart along a direction 284 that is parallel to right ascension axis 210. A midsection 224 is located between, and spaced apart in a direction parallel to right ascension axis 210 from, the first and second opposed ends 218, 220. Body 246 has a declination base length measured in direction 284 between first and second ends 218, 220. Midsection 224 has a midsection length measured in direction 284 and the midsection length is between 10%-80% of the declination base length, including any value therebetween, e.g. 15%, 20%, 25%, 30%, 35%, 40%, 45%, 50%, 55%, 60%, 65%, 70%, and 75%. In other words, body 202 has a declination base length measured in direction 284 between first and second ends 218, 220. Midsection 224 is spaced apart from each of first and second ends 218, 220 by at least 10% of the declination base length.

Body 246 comprises a pair of declination supports 248, 250. First declination support 248 extends from first end 218 of body 246 along a direction that is parallel to declination axis 212. Second declination support extends from second end 220 of body 246 along a direction that is parallel to declination axis 212. First and second declination supports 248, 250 each are axially aligned along right ascension axis 210. In the illustrated embodiment of FIGS. 5-7, declination supports 248, 250 each is a sleeve in the shape of a generally hollowed-out cylinder. First and second declination supports 248, 250 each define a declination-support bore extending axially along right ascension axis 210. In other embodiments, declination supports 248, 250 can be of any suitable configurations and shapes as long as declination supports 248, 250 can be coupled to base 202 to enable rotation of declination base 204 relative to base 202 about right ascension axis 210.

Base 202 comprises first and second right ascension support 226, 226' and a lower portion 242.

First and second right ascension supports 226, 226' are spaced apart from each other long right ascension axis 2210. First and second right ascension supports 226, 226' each comprise a right ascension shaft portion. The first right ascension shaft portion is configured to extend into the first declination-support bore. The second right ascension shaft portion is configured to extend into the second declination-support bore. Each one of the right ascension shaft portions comprises a bearing surface to bear against a bore-defining surface of the corresponding declination-support bore to provide the rotational coupling between the first declination support and the right ascension support.

Lower portion 242 connects first and second right ascension support 226, 226'. Lower portion 242 extends downwardly from first and second right ascension support 226, 226'. Lower portion 242 is similar to a crescent moon shape having a curved body 274 and first and second ends 276, 278. First and second ends 276, 278 are coupled to first and second right ascension support 226, 226', respectively.

Curved body 274 may be coupled to a latitude adjustment assembly 214 for aligning mount 200 so that the angle of altitude adjustment assembly 214 is set to be approximately the same as the latitude where mount 200 is used.

Declination base 204 is coupled to base 202 and is rotatable relative to base 202 about right ascension axis 210. In the illustrated embodiment of FIGS. 5-7, the rotatable connection between declination base 204 and base 202 is provided by (i) the hinge connection between first declination support 248 and first right ascension support 226 and (ii) the hinge connection between second declination support 250 and second right ascension support 226'.

To connect first right ascension support 226 with first declination support 248, the right ascension shaft 230 is inserted into the bore of first declination support 248 so that the bearing surface of first right ascension support 226 bears against the bore defining surface of first declination support sleeve 248. To connect second right ascension support 226' with second declination support 226, the right ascension shaft 230 is inserted into the bore of first declination support 248 so that the bearing surface of second right ascension support 226 bears against the bore defining surface of second declination support sleeve 248.

First right ascension support 226 is positioned between first and second declination supports 248, 250 axially along right ascension axis 210. In contrast to equatorial mount 100, first right ascension support 226 is not connected to second declination support 250 and thereby a space is provided between first right ascension support 226 and second declination support 250 along right ascension axis 210. In an alternative embodiment, first ascension support 226 bears against both first and second declination supports 248, 250.

Also in contrast to equatorial mount 100, polar scope 232 is attached to declination body 246 and is disposed axially in a direction that is parallel to and away from right ascension axis 210.

The invention claimed is:

1. An equatorial mount for an optical assembly, the equatorial mount comprising:
   a base;
   a declination base coupled to the base and rotatable relative to the base about a right ascension axis, the declination base comprising a body and a counterweight assembly extending from the body along a counterweight axis and the base comprises a right ascension support extending axially along the right ascension axis; and
   a device support supported by the declination base for rotation with the declination base about the right ascension axis, the device support rotatable relative to the declination base about a declination axis;
   wherein:
   the right ascension axis is orthogonal to the declination axis;
   the declination axis intersects a midsection of the declination base; and
   the counterweight axis is parallel to, and spaced apart from, the declination axis.

2. An equatorial mount as defined in claim 1, wherein the body comprises first and second opposed ends and the midsection is located between, and spaced apart in a direction parallel to the right ascension axis from, each of the first and second opposed ends.

3. An equatorial mount as defined in claim 2, wherein the body has a declination base length measured in the direction parallel to the right ascension axis between the first and second ends, and wherein the midsection has a midsection length measured in the direction parallel to the right ascension axis, the midsection length between 10%-80% of the declination base length.

4. An equatorial mount as defined in claim 2, the body having a declination base length measured in the direction parallel to the right ascension axis between the first and second ends, and wherein the midsection is spaced apart from each of the first and second ends by at least 10% of the declination base length.

5. An equatorial mount as defined in claim 2, wherein the counterweight assembly extends from the first end of the body along the counterweight axis.

6. An equatorial mount as defined in claim 2, wherein the counterweight assembly extends along the counterweight axis from a location on the body that is more proximate to the first end of the body than the declination axis.

7. An equatorial mount as defined in claim 1, wherein the right ascension support comprises a sleeve, the sleeve comprising a bore-defining surface that defines a right ascension bore that extends axially along the right ascension axis.

8. An equatorial mount as defined in claim 1, wherein the body of the declination base comprises:
   first and second opposed ends; and
   a first declination support at the first end, the first declination support being rotatably coupled to the right ascension support to thereby facilitate rotation of the declination base relative to the base about the right ascension axis.

9. An equatorial mount as defined in claim 8, wherein:
the first declination support comprises a first declination-support sleeve shaped to define a first declination-support bore extending axially along the right ascension axis; and
the right ascension support comprises a right ascension shaft portion which extends into the first declination-support bore, the right ascension shaft portion comprising a bearing surface that bears against a bore-defining surface of the first declination-support sleeve to provide a rotational coupling between the first declination support and the right ascension support.

10. An equatorial mount as defined in claim 9, wherein the body of the declination base comprises a second declination support at the second end to thereby facilitate rotation of the declination base relative to the base about the right ascension axis, the second declination support spaced apart from the first declination support in a direction parallel with the right ascension axis.

11. An equatorial mount as defined in claim 10, wherein:
the base comprises a second right ascension support extending axially along the right ascension axis;
the second declination support comprises a second declination-support sleeve shaped to define a second declination-support bore extending axially along the right ascension axis; and
the second right ascension support comprises a second right ascension shaft portion which extends into the second declination-support bore, the second right ascension shaft portion comprising a bearing surface that bears against a bore-defining surface of the second declination-support sleeve to provide a rotational coupling between the second declination support and the second right ascension support.

12. An equatorial mount as defined in claim 10, wherein the right ascension support bears against both the first and second declination supports.

13. An equatorial mount as defined in claim 11, wherein the right ascension shaft portion is spaced apart from the second right ascension shaft portion in a direction parallel with the right ascension axis thereby forming a hollow centre between the right ascension support and the second right ascension support.

14. An equatorial mount as defined in claim 10, wherein:
the base comprises a second right ascension support extending axially along the right ascension axis;
the second right ascension support comprises a right ascension sleeve shaped to define a right ascension support bore extending axially along the right ascension axis; and
the second declination support comprises a declination support shaft portion which extends into the right ascension support bore, the declination support shaft portion comprising a bearing surface that bears against a bore-defining surface of the right ascension support sleeve to provide a rotational coupling between the second declination support and the second right ascension support.

15. An equatorial mount as defined in claim 14, wherein the first right ascension shaft portion is spaced apart from the declination support shaft portion in a direction parallel with the right ascension axis thereby forming a hollow centre between the first right ascension support and the second right ascension support.

* * * * *